July 6, 1926.

R. D. MAILEY ET AL 1,591,175

GLASS WORKING MACHINERY

Filed Sept. 6, 1924

INVENTOR
Roy D. Mailey
Hilford J. Winninghoff
BY
Thos. H. Brown
THEIR ATTORNEY

July 6, 1926.

R. D. MAILEY ET AL 1,591,175

GLASS WORKING MACHINERY

Filed Sept. 6, 1924   3 Sheets-Sheet 3

INVENTOR
Roy D. Mailey
Wilford J. Winninghoff
BY
Thos. D. Brown
THEIR ATTORNEY

Patented July 6, 1926.

1,591,175

UNITED STATES PATENT OFFICE.

ROY D. MAILEY AND WILFORD J. WINNINGHOFF, OF EAST ORANGE, NEW JERSEY, ASSIGNORS TO COOPER HEWITT ELECTRIC COMPANY, OF HOBOKEN, NEW JERSEY, A CORPORATION OF NEW JERSEY.

GLASS-WORKING MACHINERY.

Application filed September 6, 1924. Serial No. 736,353.

Our present invention relates to methods and means for working glass into manufactured articles, and particularly to methods and means for making and blowing articles of hollow glassware.

In the manufacture of a glass vessel comprising a main body and a smaller chamber connecting therewith I find it expeditious to form these parts separately and then fuse them together to form a large chamber and the smaller chamber connecting therewith.

It is therefore an object of our invention to provide method and apparatus for working the two glass parts to fuse them together to form an article of the character described. It is of course to be understood, however, that the methods and apparatus of our invention are applicable generally in the arts.

In the drawings forming part of this application:

Figure 1:
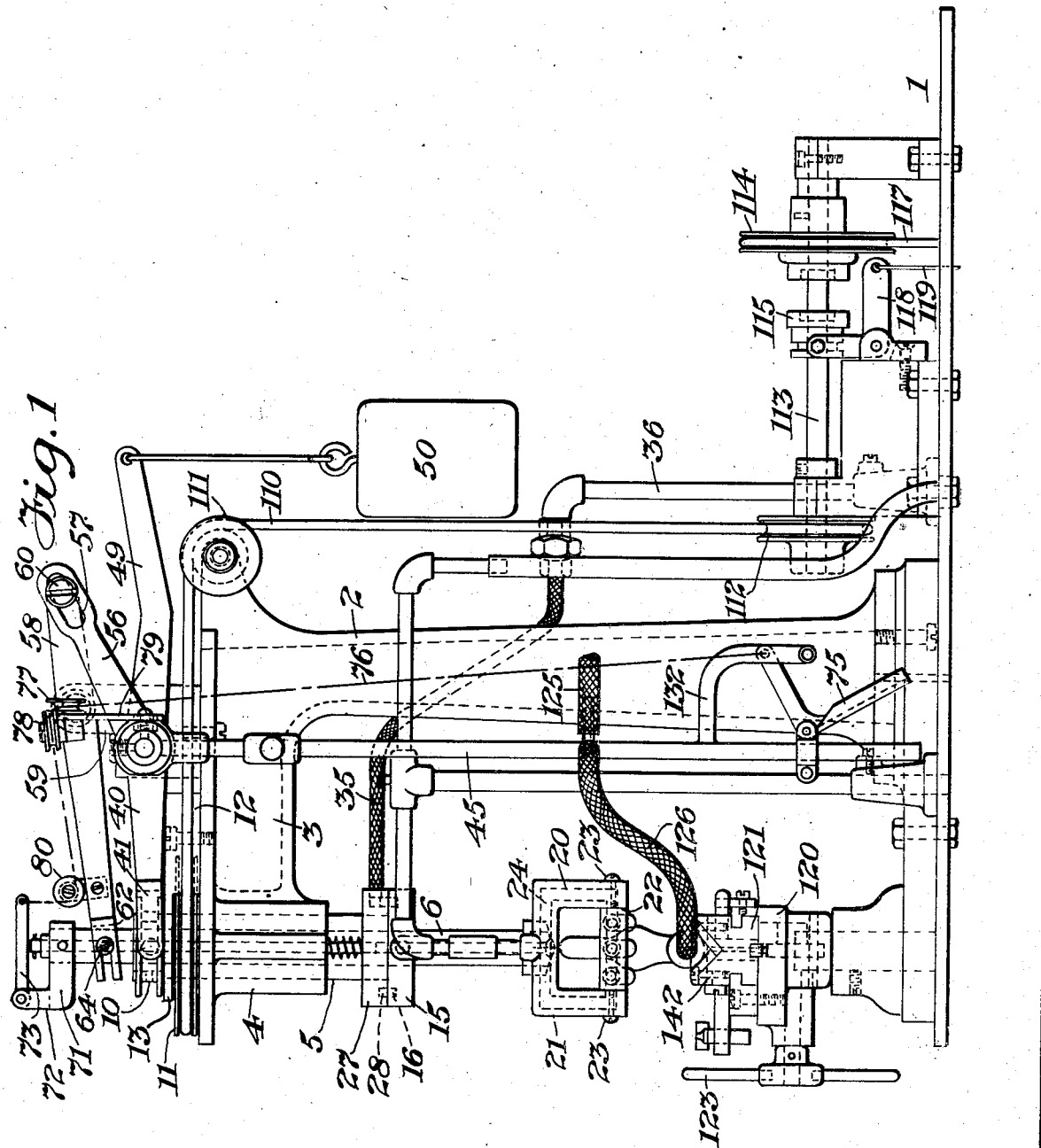
Fig. 1 is a side elevation view of a machine for splicing a glass tube onto another glass tube at an angle thereto with means for clamping and positioning with respect to said second tube a wire sealed into said first tube at its end when for instance said machine is used for anode forms onto a tube for a mercury vapor lamp.
Figure 2:
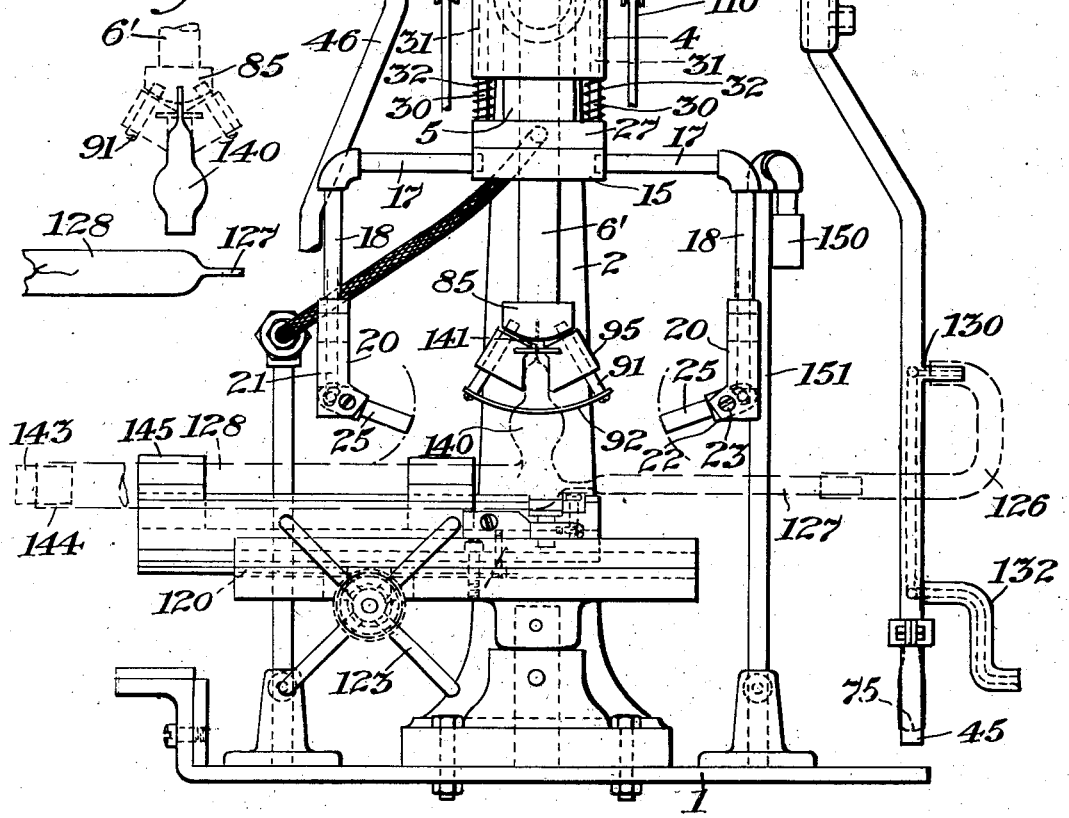
Fig. 2 is a front elevation view of the machine of Fig. 1.
Figure 3:
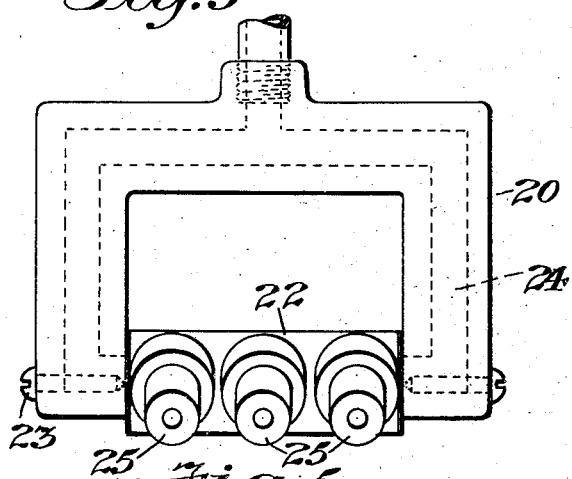
Fig. 3 is a front elevation view of a gas torch used in the machine of Fig. 1.
Figure 4:
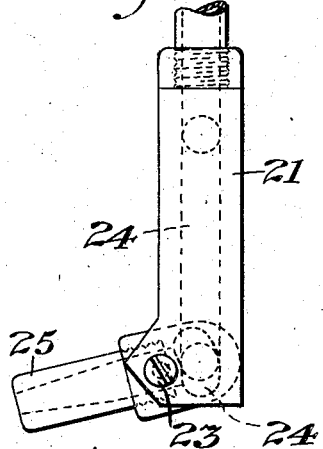
Fig. 4 is a side elevation view of the torch of Fig. 3.
Figure 5:
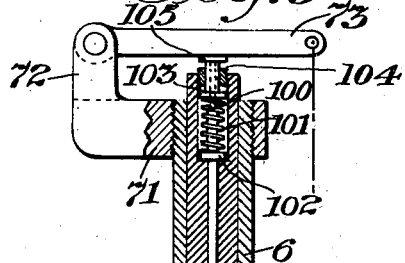
Fig. 5 is a vertical sectional view in elevation of the clamping means of Fig. 1 in the closed position showing means for closing and opening the same.
Figure 6:
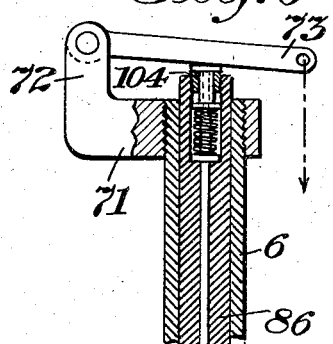
Fig. 6 is a vertical sectional view similar to Fig. 5 with the clamping means open.
Figure 7:
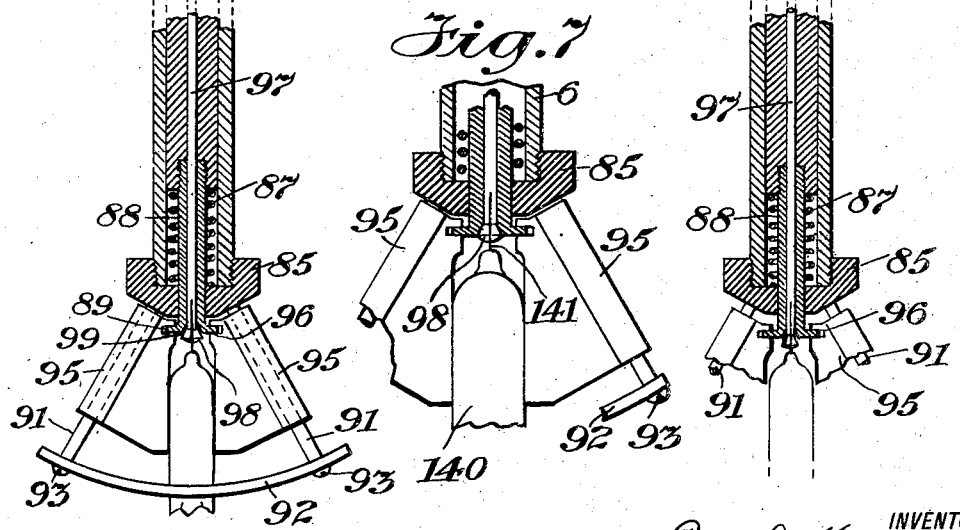

In the drawings the table 1 supports the standard 2 having the arm 3 projecting therefrom forwardly at its upper end. At its forward end said arm 3 supports the block 4 having slidably and rotatably mounted therethrough vertical hollow cylinder 5 through which in turn is slidably mounted the hollow shaft or spindle 6. At the upper end of cylinder 5 is mounted the annularly grooved double flange member 10. Slidably mounted on said clinder 5 between member 10 and block 4 is mounted the pulley 11 which drives said cylinder 5 through a sliding key and keyway arrangement not shown but well known and common in the art. The member 12 fixed to the top of said arm 3 and having an extension 13 projecting over said pulley 11 serves with the upper end of block 4 to limit the movement of said pulley vertically. At the lower end of cylinder 5 is mounted the flange 15 concentrically therewith which has formed on its upper surface the annular channel 16 which connects with the pipes 17 mounted horizontally one on each side of said flange 15. Said pipes 17 carry at their outer extremities pipes 18 which connect therewith and therethrough said channel 16 and carry at their lower ends the hollow fire members 20. Each of said fire members 20 comprises an inverted U shaped member such as a casting which has a cavity formed therein and extending substantially throughout its length, said cavity communicates with the outside through an opening at the middle of the U upwardly and also near the ends of the legs at the inner lateral surfaces thereof. Through said upward opening, member 21 communicates with the pipe 18. Through said leg openings the cavity communicates with the hollow block 22 which is pivoted between the legs of the U by means of the screws 23. The cavity 24 in said member 21 extends cross sectionally to provide for communication between it and the cavity 21 in different positions of said member 21 as it is moved on said screws 23. Extending downwardly and laterally from said member 21 are mounted the fire nozzles 25 which communicate with said cavity 24 and consequently with said channel 16. About said cylinder 5 between head 4 and flange 15 is movably mounted the annular member 27 which rests on said flange 15 and has formed in its lower surface the channel 28 which registers with channel 16. The rods 30 fixed to the upper side of said ring 27 extend upwardly and fit slidably into the vertical holes 31 formed in said head 4 and serve to prevent rotation of said ring 27. By rotated movement of said flange 15 the compression springs 32 mounted about said rods 30 and pressing against said head 4 and said ring 27 serve to hold said ring 27 against said flange 15 to thereby secure a gas tight joint therebetween. Mounted to said head 27 and communicating with said channel 28 is one end of the flexible hose 35 the other end of which is connected to the pipe 36 which is in turn connected to a suitable source of gas supply. On said arm 3 and back of said cylinder 5 is pivoted the arm 40 which carries at its forward end the fork 41 which carries at each of its tips pin members 42 which project one on either side into the channel of member 10 and have mounted therein the roller member 43. Said arm 40 is connected at its pivot to the lever 46 which serves as a handle for raising and lowering the end of said arm 40 and thereby for raising and lowering said cylinder 5. The annular channel member 10 into which said pin members 42 engage provide actuating engagement between said arm 40 and said sleeve 5, when said sleeve 5 is rotated by means of the pulley 11 as hereinafter more fully described. Also fixed to said arm 40 at its pivot and extending backwardly is the arm 49 which carries at its outer end the counter weight 50 which tends to hold said cylinder 5 and thereby said burner members 20 at an upper limit of vertical movement.

The lever 45 is connected to the arm 56 which extends backwardly and upwardly and has formed therein at its outer end the longitudinal slot 57. Said lever 45 and arm 56 are pivoted at their juncture on said arm 3. Above said arm 40 is mounted the lever 58 which is pivoted between its ends at a point to the rear of the pivots of arms 40 and 56 and on the bracket member 59 carried by said standard 2. At its forward end said arm 58 carries the fork 62 which straddles the upper end of said shaft 6, each leg of said fork being itself formed into a fork and straddling the pin 64 mounted one on each side of said shaft 6.

Said hollow shaft 6 carries at its upper end member 71 screwed thereto which in turn carries a post 72 projecting upwardly and forwardly of the axis of said shaft 6 and having pivoted thereto by bolt 71 the lever 73 which extends over and across the center of the end of the shaft 6 and terminates at a little distance therebeyond. For depressing said lever 73 the bell crank 75 is mounted at the handle end of the handle lever 45 and is connected to said lever 73 by means of a chain or thong 76 which passes over pulleys 77 and 78 mounted on standard 79 at the pivoted end of handle lever 45 and over the pulley 80 mounted below the end of lever 73 and on the lever 58 near its forked end.

Said hollow shaft 6 carries at its lower end the annular cap 85. Within said shaft 6 is slidably mounted the hollow shaft 86 which terminates at its lower end within said shaft 6 and has its upper end normally extending beyond the upper limit of said shaft 6 being held in such a position by the compression spring 87 mounted within said shaft 6 and between the lower end of said shaft 86 and the inner face of said annular cap 85. Extending through the central opening of said annular cap 85 and screwed into the lower end of said shaft 86 is the sleeve 88 which carries at its lower and outer end the annular flange 89. Said sleeve 88 has an interior diameter substantially the same as the principal interior diameter of said hollow shaft 86. Said annular cap 85 carries on its lower side four posts 91 equally spaced from each other and mounted along lines extending downwardly and outwardly the upper projections of which converge at a point on the axis of said annular cap 85 the straps 92 span the ends of said posts 91 and are secured thereto by the screws 93. On each of said posts 91 is slidably mounted a clamp jaw 95 each of which has formed therein a slot 96 which fits onto the adjacent portion of said flange 89 and which with said flange serves to hold the respective clamp jaws 95 in position with relation to each of the others. Extending through the bore of shafting 6 and sleeve 88 is the rod 97 which carries at its inner end the spring chuck 98 the conical exterior of which fits into the counter sink 99 formed at the lower extremity of the bore of said sleeve 88. At the upper extremity of said shaft 86 is formed a counter bore 100 concentric with the main bore of said shaft in which is positioned the tension spring 101 positioned about said rod 97 and pressing at its lower end on the washer 102 seated on the bottom of said counter bore 101 and at its upper end against the flange 103 fixed on said rod 97 whereby said spring 101 tends to hold said chuck 98 seated in said counter bore 99 whereby said chuck is held closed. The annular plug 104 screwed into the upper end of said counter bore 99 serves to guide the upper end of said rod 97 in its vertical movement. The flange 105 formed on the upper end of said rod 97 serves as a seat for said lever 73 when the lever is pressed thereon by means of said belt or chain 75. The said spring 87 tends to move sleeve 88 and shaft 86 upwardly whereby said flange 89 carries said clamp jaws 95 upwardly and inwardly on the rods 91 to impart clamping action to said clamp jaws 95. The distance between adjacent surface of said clamp jaws 95 is predetermined according to the size of the article to be clamped therebetween and the distance of movement between the extreme open and extreme closed position by the distance of movement of said flange 89 and the angle of inclination of said rods 91 upon which said jaw clamps slide.

Rotational movement is imparted to said fires 20—25 by means of said pulley 11 which is in turn actuated through the belt 110 passing over pulleys 111 through pulley 112 mounted on counter shaft 113 which in turn is driven by the pulley 114 which connects therewith through clutch 115, said pulley 114 being actuated through belt 117 by a suitable motive source not shown. Said clutch 115 is moved into and out of engagement with said pulley 114 by means of the bell crank 118, connected by rod 119 to a suitable actuating means such as a pedal not shown.

On base 1 is mounted below the clamping mechanism and fires above described clamping table 120, clamping gear 121 which is movable thereon by means of the hand wheel 123 through suitable gear in connection as is commonly known in the art. The pipe line 125 connected by flexible hose 126 to the tabulation 127 of the hollow glass member 128 which is held on the clamps of clamping table 121 serves to admit air under pressure into the interior of said member 128 for the proper formation thereof when worked in the heat of said fires 20—25. The by-pass 130 connects said air supply pipe 125 to the interior of said lever handle 45 which is of pipe and therethrough to the pipe 132 mounted thereon and terminating near said bell crank 75. Said pipe 125 is of flexible material to allow for the movement of its connection to said lever 45. In the drawings said chuck 98 and said clamp jaws 95 are shown holding an anode chamber 140 and being fused to said chamber 128 which is the main member of a vapor arc lamp, the body of said anode chamber 140 being held by said clamps 95 and the anode terminal 141 thereof being held by said chuck 98.

In the operation of the device of my invention the hollow glass member 128 is supported in clamps and a glass anode chamber 140 is mounted between the clamping jaws 95 and the electrode lead 141 clamped between the jaws of the spring chuck 98. Said chuck 98 and clamp jaws 95 are operated for the opening and closing thereof by means of bell crank 75 the handle of which to open the chuck and clamp is pressed toward the lever handle 45, thereby drawing the lower end of chain 76 downwardly and so drawing lever 73 down against said flange 105 on the upper end of rod 97 whereby said lever is pushed downwardly against the spring 101, and the spring chuck 98 unseated from countersink 99 to allow said chuck to spring open. Further movement of said bell crank 75 and consequently of lever 73 brings the latter against the top of sleeve 86 and causes it to move downwardly whereby said clamp jaws 95 pushed downwardly on rods 91 by flange 89 will spread apart. Upon the release of bell crank 75 the springs 87 and 101 will cause clamps 95 and chuck 98 to close on anode chamber 140 and on electric terminal 141 which for example, being placed between the clamps with the terminal 141 in the chuck will, upon such release, be firmly held by said clamp and chuck.

A piece of tubing 128 closed at one end as by the stopper 143 and tubulated the other end is mounted on the bed plate 121, by clamps 145 the tubulation 127 being connected to the flexible air pressure pipe 126. By means of the handle 123 the end of said tube 128 which is next said tubulation 127 is moved with said bed plate 121 to a position under the gas jet 150 which is fed by the supply pipe 151. By the proper operation of a suitable treadle operated valve not shown a jet of flame from said burner 150 is made to impinge on said end of tube 128 and when the proper temperature is reached such as is well known in the glass working art the glass at the heated point is blown out to form a splicing rim by closing the open end of tube 132 with a finger of the hand used for operating lever 45 whereby pressure in the tube is caused to rise high enough to blow out the softened glass.

Bed plate 121 and tube 128 are then moved by handle 123 until said blow out is positioned under said anode chamber 140 held by said clamp comprising the jaws 95, 95 and the chuck 98 which latter by a backward movement of the lever 45 is brought into position close to said blow out. Said fires 20, 25 are turned up from a low burning or pilot ignition by means of a switch treadle operated valve not shown and by a backward movement of handle 46 said fires 20, 25 are moved downwardly until the flames thereof impinge on the glass at said blow out and on the lower end of the said anode chamber. By moving said anode chamber up and down as desired through lever 45, rotating fires 20, 20 by means of said pulley 114, moving said fires 20, 20 up and down by lever 46, and regulating the pressure in tube 128 through varying the size of the opening in said tube 132 with the finger, the anode chamber 140 is fused to said tube 128 in a manner well known in the glass working art. When such fusing is completed said anode chamber and the wire sealed therethrough are released from chuck and clamp 95—98 by means of hand lever 75, the chuck-clamp 95—98 are moved upwardly by bringing lever 45 forward, fires 20, 20 are turned low by the treadle valve, and the fires moved up by bringing said lever 46 forward. Tubulation 127 is then disconnected from flexible tube 126 and tube 128 replaced by a new one. Another anode chamber being inserted in chuck-clamp 95—98 the operation is repeated as before.

We claim:

1. In apparatus for joining tubular glass, in combination, means for heating the glass at and near the points of jointure, means for varying the amount of heat emitted from said heating means, and means for varying the pressure of the atmosphere within the joined parts.

2. In apparatus for joining tubular glass, in combination, means for heating the glass at and near the points of jointure, means for varying the amount of heat emitted from said heating means, and means for varying the pressure of the atmosphere within one of the parts to be joined.

3. In apparatus for joining hollow glass, in combination, means for heating the glass, means for moving said heating means toward and away from the point of jointure, means for producing pressure in the hollow glass and means for moving the parts to be joined toward and away from each other.

4. In apparatus for joining hollow glass, in combination, means for heating the glass at the points of jointure, means for varying the heating thereof, means for moving said heating means rotatably about the point of jointure, means for producing pressure in said hollow glass, means for varying said pressure, separate means for holding the parts to be joined, means for moving the parts to be joined toward and away from each other, and means for moving said parts to be joined with respect to each other.

5. In apparatus for joining hollow glass, in combination, means for heating the glass at the points of jointure, means for varying the heating thereof, means for moving said heating means rotatably about the point of jointure, means for producing pressure in said hollow glass, means for varying said pressure, separate means for holding the parts to be joined, means for moving the parts to be joined toward and away from each other, means for moving said parts to be joined with respect to each other and a second heating means for heating one of said parts to be joined at its point of jointure.

6. In apparatus for joining glass, holding means comprising a radial clamp, and a second clamp within the lateral confines of first said clamp.

7. In apparatus for joining glass, holding means comprising a radial clamp, and a second clamp within the lateral confines of first said clamp, means tending to close first said clamp, means tending to close second said clamp; and means for successively overcoming the second said closing means, and opening second said clamp, and means for overcoming the first said closing means, and opening first said clamping means.

8. In apparatus for joining hollow glass, in combination, means for heating the glass at the points of jointure, means for varying the heating thereof, means for moving said heating means rotatably about the point of jointure, means for producing pressure in said hollow glass, means for varying said pressure, separate means for holding the parts to be joined, means for moving the parts to be joined toward and away from each other, and means for moving said parts to be joined with respect to each other; holding means comprising a radial clamp, and a second clamp within the lateral confines of first said clamp, means tending to close first said clamp, means tending to close second said clamp; and means for successively overcoming the second said closing means, and opening second said clamp, and means for successively overcoming the first said closing means, and opening first said clamping means.

9. In apparatus for joining hollow glass, in combination, means for heating the glass at the points of jointure, means for varying the heating thereof, means for moving said heating means rotatably about the point of jointure, means for producing pressure in said hollow glass, means for varying said pressure, separate means for holding the parts to be joined, means for moving the parts to be joined toward and away from each other, means for moving said parts to be joined with respect to each other and a second heating means for heating one of said parts to be joined at its point of jointure, holding means comprising a radial clamp, and a second clamp within the lateral confines of first said clamp; and means for successively overcoming the second said closing means, and opening second said clamp, and means for successively overcoming the first said closing means, and opening first said clamping means.

10. In apparatus for joining glass holding means, comprising a radial clamp and a second clamp within the lateral confines of first said clamp, means adapted for moving said clamps to open and closed positions thereof one of said clamps having tapering outer surfaces on the jaws thereof and a sleeve having an inner surface adapted to be moved on to the tapered outer surface of said jaws to close them, the jaws of said other clamp being mounted for diagonal movement, and connection between said sleeve and the jaws of said other clamp permitting lateral movement with respect to each other but whereby axial movement of said sleeve causes opening or closing movement of the jaws of said other clamp.

11. In apparatus for joining glass holding means, comprising a radial clamp and a second clamp within the lateral confines of first said clamp, means adapted for moving said clamp to open and closed positions thereof one of said clamps having tapering outer surfaces on the jaws thereof and a sleeve having an inner surface adapted to be moved onto the tapered outer surface of said jaws to close them, the jaws of said other clamp being mounted for diagonal movement and connection between said sleeve and the jaws of said other clamp permitting lateral movement with respect to each other but whereby axial movement of said sleeve causes opening or closing movement of the jaws of said other clamps, means for moving the jaws of first said clamp axially with respect to said sleeve through a predetermined distance and for moving said sleeve axially along with first said clamp to close said other clamps, and means tending to prevent the axial movement of said sleeve along with first said clamp until first said clamp has been closed by axial movement of said sleeve in relation thereto.

Signed at Hoboken in the county of Hudson and State of New Jersey this 5th day of September A. D. 1924.

ROY D. MAILEY.
WILFORD J. WINNINGHOFF.